J. A. SMITH.
COTTON BLOCKER.
APPLICATION FILED JUNE 19, 1912.
1,058,479.
Patented Apr. 8, 1913.
2 SHEETS—SHEET 1.
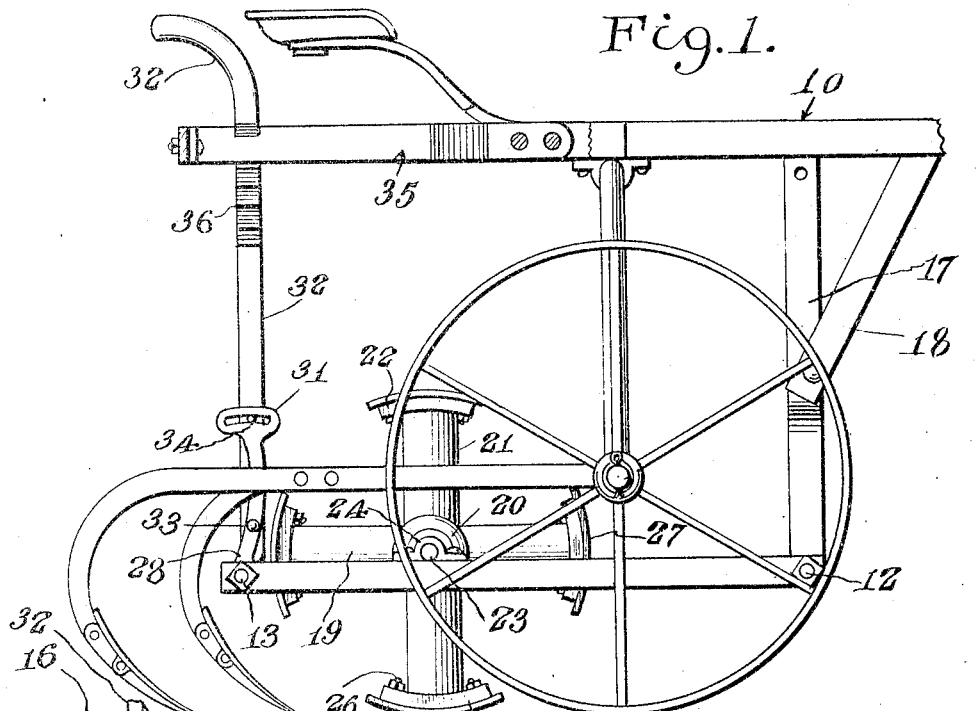
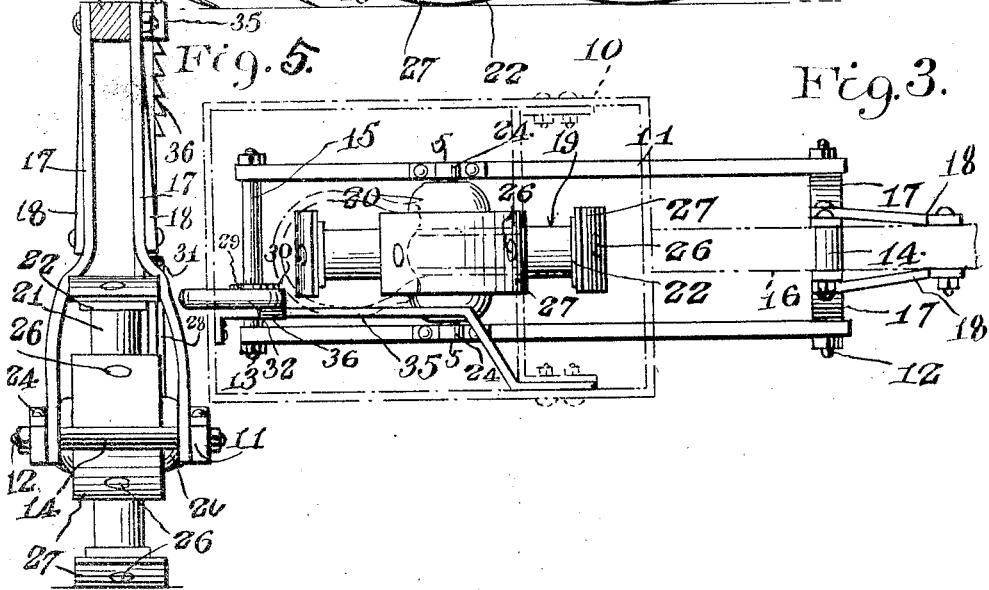

J. A. SMITH.
COTTON BLOCKER.
APPLICATION FILED JUNE 19, 1912.
1,058,479.
Patented Apr. 8, 1913.
2 SHEETS—SHEET 2.
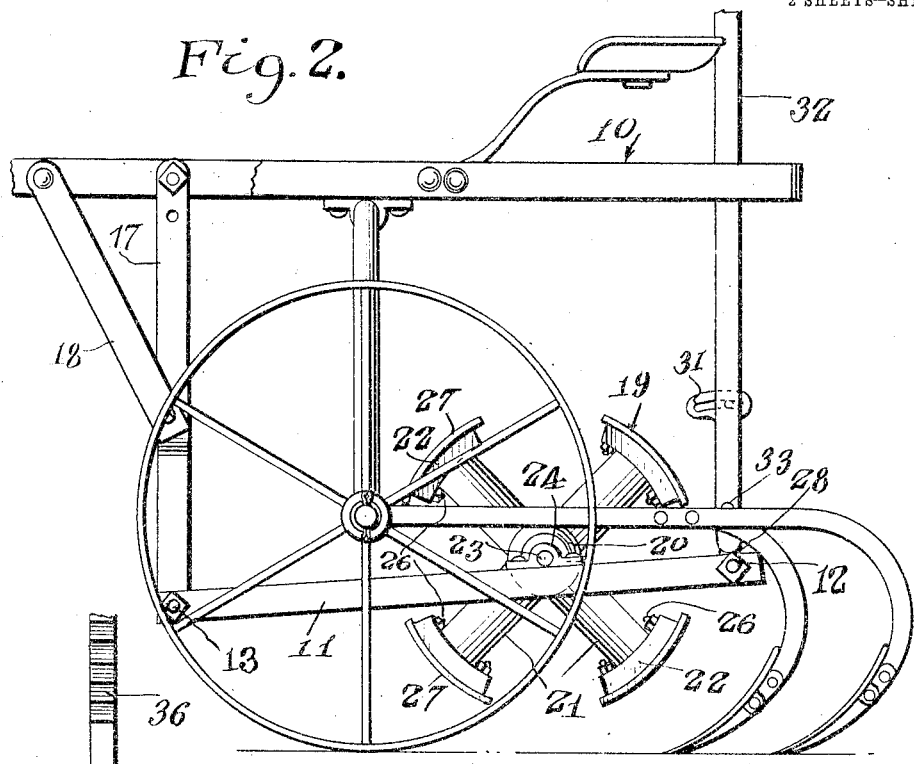
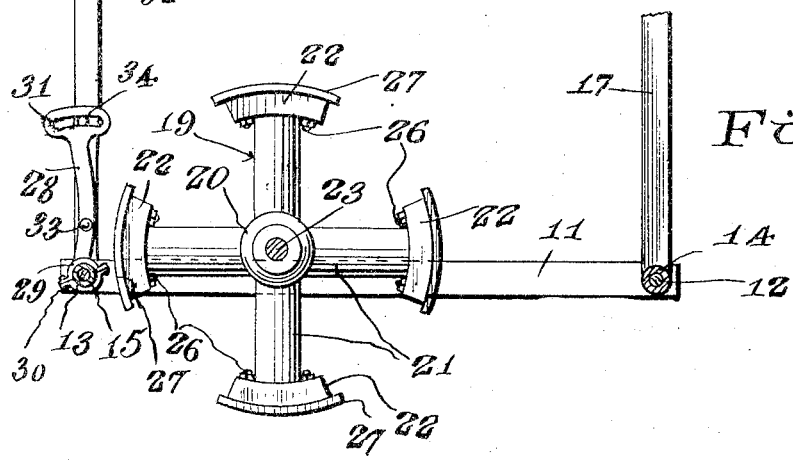
Witnesses:
J. P. Walkes.
Francis Boyle.
Inventor
J. A. Smith
Attorneys

UNITED STATES PATENT OFFICE.

JAMES A. SMITH, OF FATE, TEXAS.

COTTON-BLOCKER.

1,058,479.  Specification of Letters Patent.  Patented Apr. 8, 1913.

Application filed June 19, 1912. Serial No. 704,624.

*To all whom it may concern:*

Be it known that I, JAMES A. SMITH, a citizen of the United States, residing at Fate, in the county of Rockwall, State of Texas, have invented certain new and useful Improvements in Cotton-Blockers; and I do hereby declare the following to be a full, clear, and exact description of the invention, such as will enable others skilled in the art to which it appertains to make and use the same.

This invention relates to cotton chopping machines and has for an object to provide a novel device of this character adapted to distance the young cotton stalks at any desired intervals by pressing down such stalks as it seems desirable to destroy.

A still further object of the invention is to provide a means for raising the device above the ground when it is desired to turn the cultivator to which the device is adapted to be applied, at the end of a row.

With the above objects in view the invention consists of certain novel details of construction and combination of parts hereinafter fully described and claimed, it being understood that various modifications may be made in the minor details of construction within the scope of the appended claim.

In the accompanying drawings forming part of this specification: Figure 1 is a side elevation of the device assembled with a cultivator. Fig. 2 is a view of the reverse side of the device from that shown in Fig. 1, and showing the device in raised position. Fig. 3 is a plan view of the device. Fig. 4 is a longitudinal sectional view through the device. Fig. 5 is a front elevation of the device.

Referring now to the drawings in which like characters of reference designate similar parts, 10 designates in general a sulky cultivator to which the cotton chopper is designed to be assembled, the sulky cultivator being of any preferred type.

The cotton chopper comprises a supporting frame consisting of spaced side bars 11 connected at their front and rear ends by bolts 12 and 13 upon which spacing sleeves 14 and 15 are disposed between the side bars. The frame is secured to the cultivator tongue 16 by means of spaced parallel links 17, these links being bolted at their upper ends through the side edges of the tongue and being provided at their lower ends with openings which loosely receive the end portions of the bolt 12. The frame is thus pivotally attached at the forward end to the links. For bracing the links a pair of inclined braces 18 are bolted to the side edges of the tongue and to the links.

The roller 19 is in the form of a spoked wheel the hub 20 of which is revolubly mounted between the side bars and the spokes 21 of which are each equipped on the outer end with an arcuate tread plate 22 which is substantially oblong in perimeter. A spindle 23 fixed in the hub of the roller is journaled terminally in bearings 24 carried in the side bars.

Each tread plate 22 is provided with alined bolt openings near the ends. These openings receive the spaced securing bolts 26 of an arcuate shoe 27 which is formed of sheet metal and is bowed longitudinally to conform to the curved tread surface of the tread plate. The shoe is substantially oblong in perimeter and extends marginally in all directions beyond the edges of the tread plate. It will thus be seen that the roller is equipped with a plurality of uniformly spaced curved shoes, these shoes serving to press down the young stalks which it is desired to destroy, during rotation of the roller, thereby leaving a row of alternate pressed down and standing blocks of stalks during the passage of the roller over a field of growing cotton plants.

The shoes are made in sets varying in size in order that the area of the pressed down blocks of stalks may be varied as desired. As usual in devices of this character, the plows of the cultivator follow after the rollers and simultaneously cultivate the standing blocks of stalks and cover over the pressed blocks of stalks so that the latter are killed.

For raising the roller above the ground when it is desired to turn the cultivator at the end of a row, I arrange a standard 28 on the spacing hub or sleeve 15 at the rear end of the frame, there being a foot 29 at the base of the standard having openings to receive the legs of a clevis 30 which straddles the spacing sleeve. The standard is provided with a transverse guide loop 31 at the upper end. A handle lever 32 is pivotally connected at the lower end to the standard by a pivot bolt 33 and is provided with a guide lug 34 which works in the guide loop 31.

A strap bracket 35 is terminally fixed to the cultivator frame, and arranged upon the side of the handle lever is a rack 36, the handle lever being resilient and adapted to hook any particular one of the teeth in the rack over the bracket whereby to hold the rear end of the frame and also the roller raised, it being understood that the frame is raised on its pivot by pulling up on the handle lever prior to passing the handle lever into the bracket.

The frame may be lowered by bending the handle lever laterally to free the rack from the bracket, then lowering the handle lever bodily.

By virtue of the pivotal connection 33 between the lever and standard, the lever will remain vertical regardless of whether the cultivator is in lowered or raised position, as may be seen by reference to Figs. 1 and 2, and therefore the grip 32 will always be disposed in the same relative position to the seat so as to facilitate convenient grasping by the operator.

What is claimed, is:—

A cotton chopper comprising a frame, an attaching link at the forward end of said frame pivotally connected at the lower end to said frame, a revoluble pressing roller journaled in said frame, a support, a bracket carried by said support, a rocking handle lever carried by the rear end of said frame, and means on said handle for lockingly engaging said bracket whereby to hold said roller raised from the ground.

In testimony whereof, I affix my signature, in presence of two witnesses.

JAMES A. SMITH.

Witnesses:
 CLAUDE LOUELL,
 J. T. FARRELL.